(12) United States Patent  (10) Patent No.: US 6,622,514 B2
Kesig et al.  (45) Date of Patent: Sep. 23, 2003

(54) APPARATUS AND METHOD FOR IMPROVED PROCESSING OF PVC

(75) Inventors: Ricky D. Kesig, Cincinnati, OH (US); Corey L. Dziech, Cincinnati, OH (US)

(73) Assignee: Littleford Day, Inc., Florence, KY (US)

( * ) Notice: Subject to any disclaimer, the term of this patent is extended or adjusted under 35 U.S.C. 154(b) by 0 days.

(21) Appl. No.: 09/961,648

(22) Filed: Sep. 24, 2001

(65) Prior Publication Data

US 2003/0056523 A1 Mar. 27, 2003

(51) Int. Cl.[7] .............................. F25D 25/02; F25C 1/14; B01F 15/06
(52) U.S. Cl. ......................... 62/381; 62/354; 366/144; 366/149
(58) Field of Search ................... 62/63, 381–378, 62/342, 343, 354; 366/149, 144

(56) References Cited

U.S. PATENT DOCUMENTS

| | | | |
|---|---|---|---|
| 3,591,146 A | 7/1971 | Sutter | 259/10 |
| 4,075,730 A * | 2/1978 | Siemund | 15/245 |
| 4,122,771 A * | 10/1978 | Barton et al. | 101/123 |
| 4,169,680 A | 10/1979 | Littlefield | 366/139 |
| 4,205,920 A | 6/1980 | Vigano | 366/326 |
| 4,392,361 A * | 7/1983 | Cavalli | 62/343 |
| 4,432,412 A | 2/1984 | Teske | 165/93 |
| 4,480,924 A | 11/1984 | Preda | 366/102 |
| 4,515,483 A | 5/1985 | Muller et al. | 366/303 |
| 4,571,091 A | 2/1986 | Pardo et al. | 366/311 |
| 4,938,605 A | 7/1990 | Friedrich | 366/76 |
| 4,944,600 A | 7/1990 | McKelvey | 366/142 |
| 4,958,933 A * | 9/1990 | Zakich | 366/81 |
| 5,055,273 A | 10/1991 | Wilhelm et al. | 422/135 |
| 5,415,474 A | 5/1995 | Nelson et al. | 366/139 |
| 5,489,152 A | 2/1996 | Rumph | 366/311 |
| 5,644,926 A | 7/1997 | Kress | 62/342 |
| 5,692,831 A | 12/1997 | Campbell | 366/325.5 |
| 5,823,673 A | 10/1998 | Muntener | 366/303 |
| 5,835,827 A | 11/1998 | Kishimoto | 399/254 |
| 5,887,976 A | 3/1999 | Komori et al. | 366/195 |
| 5,938,325 A | 8/1999 | Edwards | 366/129 |
| 6,267,049 B1 * | 7/2001 | Silvano | 99/455 |

* cited by examiner

Primary Examiner—William C. Doerrler
(74) Attorney, Agent, or Firm—Wood, Herron & Evans, LLP

(57) ABSTRACT

An apparatus for cooling material, such as a PVC compound, includes a chamber having an inner surface and an inner space configured for receiving material to be cooled. A rotatable shaft extends through the chamber inner space, and is operable for being rotated by a motor. At least one mixing tool is coupled to the shaft to rotate with the shaft, and mix the material while rotating around the inner surface of the chamber so the material contacts the inner surface to be cooled thereby. In one embodiment, the mixing tool includes a flexible blade configured for contacting the chamber inner surface and for sweeping across a portion of the inner surface to dislodge an amount of material from the surface portion. Another embodiment utilizes an air knife to dislodge material from the inner chamber surface. The motor is operable for rotating the shaft at a speed in the range of 150 to 250 rpm to sweep the material from the inner surface.

21 Claims, 4 Drawing Sheets

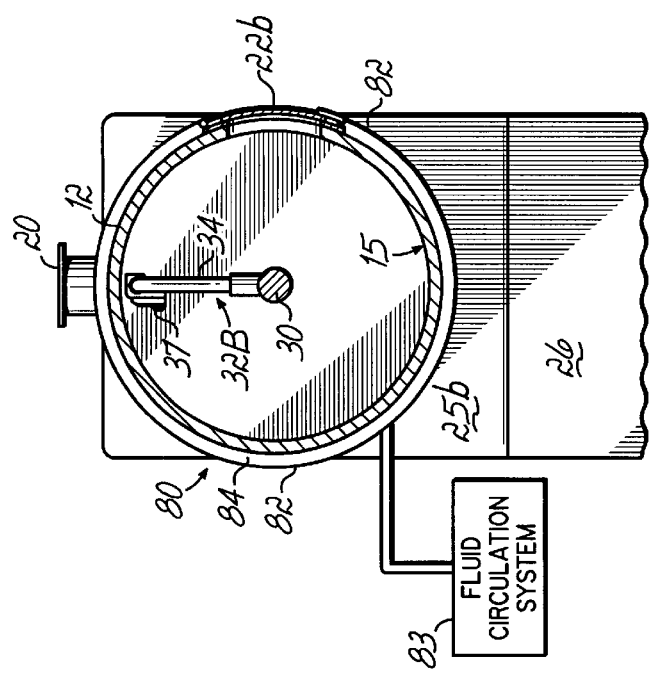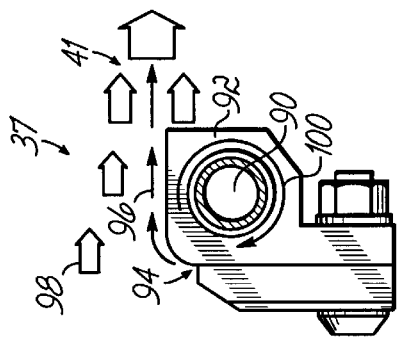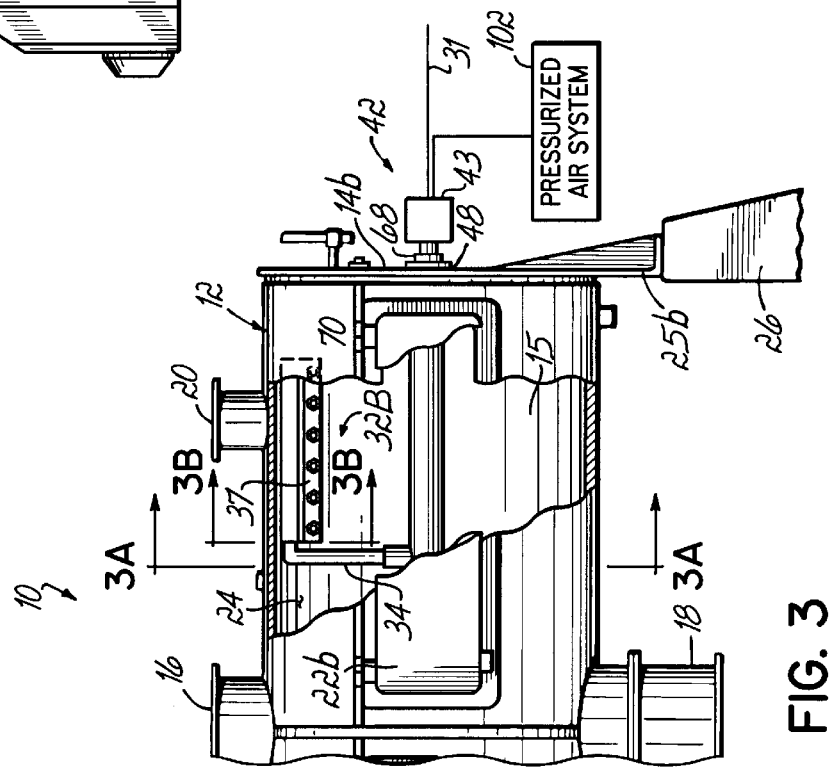

APPARATUS AND METHOD FOR IMPROVED PROCESSING OF PVC

FIELD OF THE INVENTION

This invention is directed generally to an apparatus and method for cooling materials, and specifically to cooling a PVC compound.

BACKGROUND OF INVENTION

Polyvinyl chloride, or PVC, is a well known chemical material which has widespread use in the manufacturing of various products, such as pipes, containers, and a large number of other products. In utilizing PVC in the manufacturing process, the PVC is often supplied and handled in bulk form as a loose powder or resin. The bulk material is subsequently heated to a melting point and molded into a finished product, such as through an injection molding process, for example.

Before being utilized in the molding process, raw PVC resin, must be mixed or compounded with other materials desirable for the particular product to be made or the particular end use of the PVC. For example, the raw PVC resin can be mixed with plasticizers, stabilizers, lubricants, and even pigments, such as for adding color to the PVC. Such compounding or mixing is generally accomplished in large industrial mixers which assure uniform dispersion of the plasticizers, stabilizers, and other components within the PVC resin powder while concurrently assuring that dry additives, such as dyes and lubricants impinge upon the resin particle surfaces. Commercial mixers for such purposes are available as the Model W Series from Littleford Day, Inc. of Florence, Ky., for example, which is the owner of the present application.

During compounding, the mixer converts the mixing energy of the process into a desirable uniform heat due to the particle contact friction in the batch of compounded material. The heat is necessary for the compounding process. However, in order to further process and store the PVC resin and to improve the flow characteristics of the PVC resin, the heat must then be removed from the batch. Therefore, processing of PVC resin involves a cooling step.

For cooling, large cooling units or coolers are used, and the bulk PVC resin is cooled from temperatures in the range of 220°–250° F. (a heat over 212° F. is usually desirable to reduce moisture in the mixture) to a range of 120°–125° F. as a finish temperature. Industrial coolers utilize large mixing chambers with cooled walls against which the PVC resin is directed. In one such unit, cooling fluid, such as water, is circulated against the walls of the chamber to cool its inner surface. Mixing tools which are mounted to rotate on a horizontal shaft are used to create a fluidized action which constantly exposes new surfaces of the PVC resin to the heat exchange surface on the inside of the chamber. This creates a desirable high rate of heat transfer from the PVC resin to the chamber walls. The cooling chamber is then emptied of the cooled PVC from discharge ports. Alternatively, the cooling chamber might be incorporated into a continuous system, wherein the cooled and dried PVC compound is delivered directly to a conveyor. PVC cooling units are available as Model K Series from Littleford Day, Inc. of Florence, Ky.

While existing PVC cooling units or coolers are suitable for processing PVC, it is still desirable to improve on such coolers and to improve their efficiency and product throughput. Specifically, it is desirable to improve the heat transfer characteristics of the cooler, so that a particular batch of material may be cooled more rapidly. The shorter the batch cooling time, the greater the number of batches of material that may be cooled within a particular time interval. Therefore, improving the heat transfer characteristics of the cooler results in greater batch throughput and consequently greater processing revenues and reduced processing costs per batch.

In existing PVC coolers, metal mixing tools, such as stainless steel blades, or scrapers, are mounted to extend radially from a horizontal shaft which, in turn, extends through the mixer. As the shaft rotates, the scrapers or other tools sweep around the generally cylindrical chamber against the cooled inner cylindrical surface of the chamber. The PVC compound is thereby turned over, mixed, and otherwise directed against the cooled surface for heat transfer purposes. The tools continuously move the cooled PVC away so that a new layer of PVC is directed against the cooled surface.

The mixing tools rotate at a desirable speed for turning over the batch and presenting new material to the inner surfaces for cooling. In one embodiment, the shaft and tools normally rotate in the range of 80 to 130 rpm, depending on cross-sectional diameter of the chamber. Increasing the rotational speed of the tools does not necessarily provide more rapid cooling, however, because the mixing and sweeping action of the tools introduces energy, and therefore heat, into the process. The inventors have found that the increased heat energy from high rotation speeds limits the cooling benefit gained in existing prior art PVC coolers. Therefore, rotational speeds for the mixing tools have generally been confined to 80–130 rpm.

A further drawback with existing PVC coolers is that a boundary layer of PVC builds up between the inner cooling surface and the tools due to mechanical tolerances. This boundary layer at the cooling surface hinders the overall cooling process and the heat transfer at the inner chamber surface. More specifically, due to the expansion and contraction of the metal components of a PVC cooler, including the chamber, the rotating shaft and the mixing tools, a suitable clearance (such as ¼ inch) between the outer edge of the metal mixing tools and the chamber inner surface must be maintained. The PVC becomes compacted in the clearance space and forms an insulative boundary layer which hinders the heat transfer at the surface and thus hinders cooling of the PVC resin.

Accordingly, it is an objective of the invention to improve the process of cooling a material, such as a PVC compound.

More specifically, it is an objective to reduce the batch cooling time to improve the throughput rate of a cooler or cooling unit.

It is still another objective to reduce boundary layers and build up of material at the cooling surface.

These objectives and other objectives will be more readily apparent from the description of the invention below.

SUMMARY OF THE INVENTION

An apparatus and method for improved processing of a material, such as a PVC compound utilizes a chamber having an inner surface for receiving a batch of material to be cooled. A rotatable shaft extends through the chamber inner space, and the shaft is operable for being rotated by a motor. At least one mixing tool is coupled to the shaft to rotate with the shaft, and is adapted to mix the material while rotating around the inner surface of the chamber so that the material contacts the inner surface, to be cooled by that inner surface. In one embodiment of the invention, a double-walled or jacketed chamber may be utilized with cooling fluid, such as water, circulated around the chamber for cooling purposes.

In accordance with one embodiment of the invention, the mixing tool comprises a flexible blade which is configured for contacting the chamber inner surface. The flexible blade is operable when the mixing tool is rotated, for sweeping across a portion of the inner surface and dislodging an amount of material from the surface portion so that another amount of material may contact the surface portion and be cooled. The motor which rotates the mixing tool and flexible blade is operable for rotating the shaft at a speed in the range of 150–250 rpm to sweep the material from the inner surface. The present invention thus provides improved cooling characteristics for cooling a material, such as a PVC compound.

In accordance with one aspect of the present invention, the flexible blade may be made of a PVC material, similar to a PVC material which is being cooled. That is, the flexible blade may be made of a material which is present in the material being cooled. One embodiment utilizes a flexible blade which is releasably secured with the mixing tool so that it may be readily replaced or exchanged. In accordance with another aspect of the present invention, the flexible blade includes a plurality of slots formed therein so that the blade resembles a comb-like structure.

In still another aspect of the present invention, the flexible blade may be formed of material having one of a number of selectable colors for matching the color of the material being cooled. In that way, the invention may experience blade wear during the cooling process, wherein any material worn from the blade matches the color of the material which is being cooled.

In accordance with another embodiment of the invention, the mixing tool comprises an air knife which is configured for directing a stream of pressurized air against the inner surface when the tool is rotated. The stream of air dislodges an amount of material from a portion of the surface so that another amount of material may contact the surface portion to be cooled. The stream of air might be directed perpendicular to the inner surface or tangential to the inner surface, or any angle therebetween. Pressurized air is delivered to the air knife through a hollow portion of the rotatable shaft, and the air of the air knife is appropriately vented from the chamber.

The present invention has significantly reduced the cooling times for a batch of material such as a batch of PVC compound. Therefore, the present invention addresses the objectives set forth above and other objectives, and provides an improvement over the prior art. Further details of some embodiments of the invention are set forth below.

BRIEF DESCRIPTION OF THE DRAWINGS

The accompanying drawings, which are incorporated in and constitute a part of this specification, illustrate embodiments of the invention and together with a general description of the invention given below, serve to explain the principles of the invention.

FIG. 3 is a partial perspective view of another embodiment of the invention showing a cut-away to reveal inventive features of the invention.

FIG. 3A is a cross-sectional view along lines 3A—3A.

FIG. 3B is a cross-sectional view of one embodiment of an air knife utilized in accordance with principles of the invention.

DETAILED DESCRIPTION OF SPECIFIC EMBODIMENTS

Figure 1:
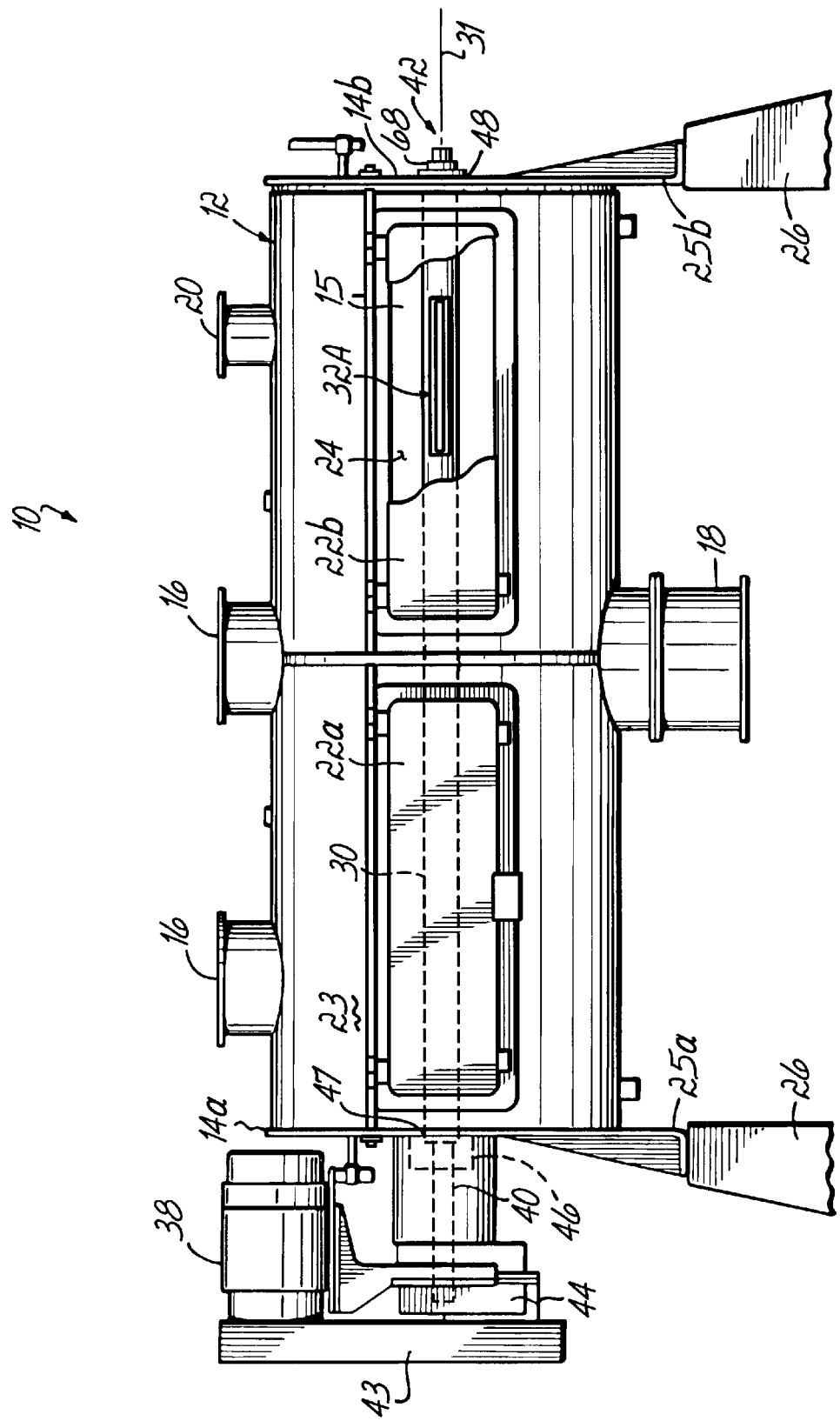
FIG. 1 is a perspective view of a cooler in accordance with the aspects of the present invention.

FIG. 1 illustrates a cooling unit or cooler 10 constructed in accordance with the principles of the present invention. The features of the invention may be used with various different types and embodiments of coolers, and the cooler 10 illustrates only one such embodiment. For example, the Model K Series of coolers from Littleford Day, Inc. may be equipped in accordance with the invention. The embodiment of the cooler 10 illustrated in FIG. 1 comprises a generally cylindrical and elongated chamber 12 which is horizontally disposed and is configured to receive therein materials which are to be cooled, such as compounded PVC material, for example. Of course, other materials might also be cooled in accordance with the invention. The mixing chamber 12 has a generally cylindrically-shaped side wall and opposing end walls or head walls 14a, 14b which close the ends of the chamber to contain the batch of material or compound. The chamber might be a double-walled or jacketed chamber as discussed further hereinbelow for cooling purposes. The chamber 12 defines an inner mixing surface 15 for containing and cooling the material. Although a cylindrically-shaped chamber is illustrated, other chamber shapes might also be utilized in accordance with the principles of the invention.

Cooler 10 includes one or more charge ports 16 and one or more discharge ports 18 utilized for charging the chamber with a batch or multiple batches of the compound to be cooled and discharging the cooled material from chamber 12. The cooler 10 of the invention may also include a ventilation port 20 or other appropriate structure for ventilating any internal air fumes or vapors generated during the cooling process and also for facilitating charge and discharge of product. Furthermore, other apparatuses may also be utilized with cooler 10 in order to cool the material being mixed, as discussed further below. Access to the inside of chamber 12 is provided by access doors 22a, 22b which are hingedly coupled to the outside surface 23 of the side wall of the chamber 12.

Chamber 10 may be made of stainless steel, and the inner surface 24 of the chamber side wall which defines inner space 15 is preferably polished so that the cooled material slides easily thereover for mixing and discharging as required. Chamber 12 is generally a large capacity cooler in the range of approximately 300–30,000 liters and therefore, the components of the cooler are expected to handle substantial loads or batches. The end walls 14a, 14b include respective leg extension portions 25a, 25b which are mounted on an appropriate support structure 26 for elevating chamber 12 and particularly the discharge port 18 above a ground surface. Alternatively, cooler 10 might be mounted directly on the ground as long as sufficient clearance of discharge port 18 is provided.

For cooling material against surface 15 of chamber 12, the cooler 10 of the invention further comprises an elongated shaft 30, having a longitudinal axis 31 which is horizontally disposed so that the shaft is preferably coaxially mounted with the cylindrically-shaped chamber 12. Shaft 30 is usually somewhat heavily constructed for handling a large load to be mixed and cooled. One suitable shaft is fabricated of 304 stainless steel, and may have an outer diameter in the mixing chamber in the range of approximately 2¼ inches to 16 inches. The length of the shaft 30 will vary with the capacity of the cooler 10.

Figure 2A:
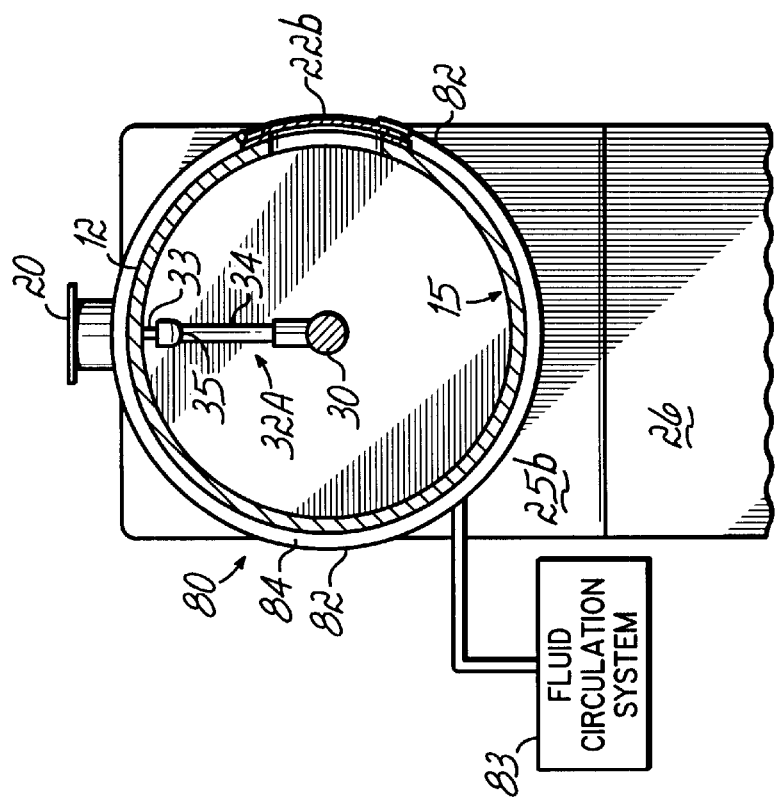
FIG. 2A is a cross-sectional view along lines 2A—2A.
Figure 2:
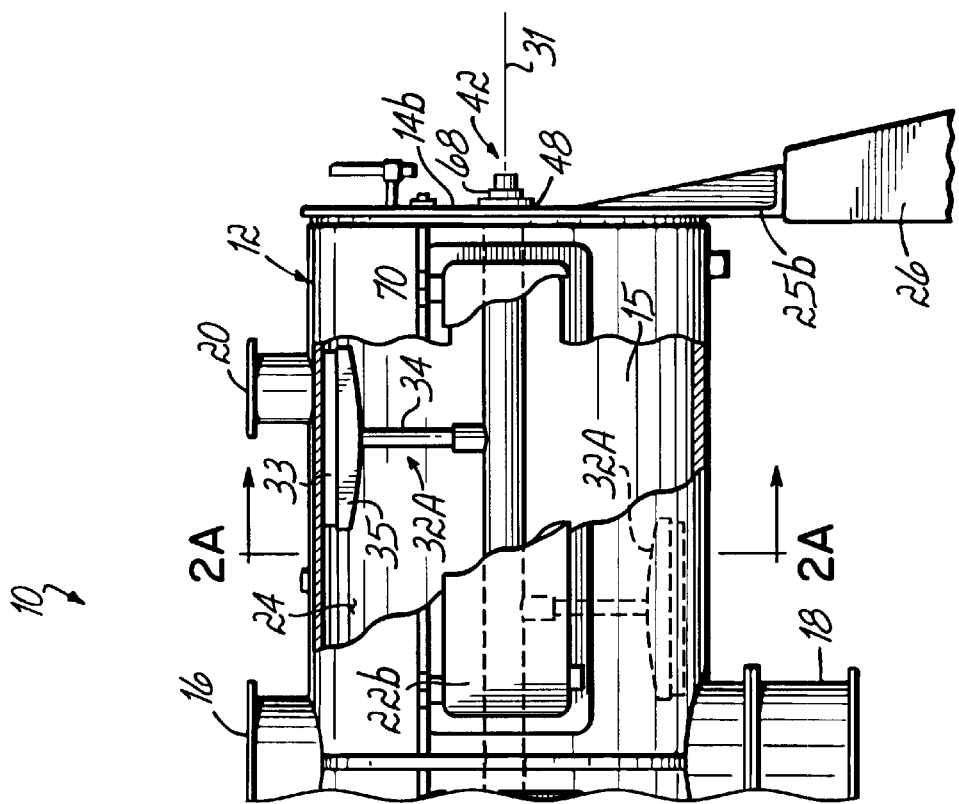
FIG. 2 is a partial perspective view of an embodiment of the invention showing a cut-away to reveal inventive features of the invention.

A plurality of mixing tools are coupled to the shaft 30 by support arms which are appropriately fixed or bolted to shaft 30 (see FIGS. 2 and 3). Preferably, the mixing tools 32a, 32b are staggered both longitudinally on shaft 30 and also radially around shaft 30 as appropriate to provide proper mixing and uniform cooling. In accordance with one aspect of the invention, the support arms and the mixing tools 32a, 32b are configured so that the tools sweep freely across a portion of the polished inner surface 15 of the chamber 12. In that way, the mixing tools engage, dislodge, and therefore mix and cool the material in the chamber so that it continually contacts the cooled inner surface and effects a heat transfer between the material and the surface.

Referring to FIG. 1, shaft 30 of the invention includes a driven end or drive end 40 and a non-driven end or stub end 42 opposite the drive end 40. A drive motor 38 is operably coupled to a belt drive 43 which, in turn, is operably coupled to the shaft drive end 40 by an appropriate gear box and bearing structure 44. The gear box and bearing structure 44 will generally reduce the drive ratio between the drive motor 42 and shaft 30. A dynamic seal structure 46 is coupled to drive end 40 between the gear box and bearing structure 44 and the respective chamber end wall 14a. The shaft drive end 40 protrudes through an appropriate opening 47 in end wall or head wall 14a.

The dynamic seal structure 46 seals an opening 47 to prevent the migration of material out of chamber 12 and into the atmosphere along the shaft 30 and through the opening 47. Seal structure 46 may comprise a series of adjacent braided packing elements (not shown) and also may include an air line (not shown) for preventing leakage as discussed above. Furthermore, seal structure 46 preferably prevents any entry of foreign matter into the chamber 12 through opening 47. Seal structure 46 is an appropriate dynamic seal for sealing the shaft drive end 40 and the opening 47 while allowing rotation of the shaft 30. To that end, seal structure 46 might also utilize appropriate air or fluid lines (not shown) to maintain a vacuum or pressurized environment within chamber 12 as necessary for properly mixing, cooling, and containing the material in chamber 12.

As illustrated in FIG. 1, drive motor 38 is indirectly coupled to shaft drive end 40 by belt drive 43 and is positioned above the shaft drive end 40. However, for other mixer applications, the drive motor 38 might be directly coupled to shaft 30 by an appropriate gear and coupling structure.

Cooler 10, and specifically chamber 12, utilizes a cooled inner surface 15 for cooling a material, such as a PVC compound. To that end, in various embodiments of the invention, as illustrated in FIGS. 2A and 3A, surface 15 is actively cooled in order to remove the heat from the material in the chamber. For example, cooling system 80 is utilized comprising one or more cooling jackets or walls 82 which overlie portions of the inner wall of chamber 12 on an outer surface thereof. That is, chamber 12 might use a jacketed construction or a double-walled construction, as shown, to provide a volume or space 84 for cooling fluid to circulate around the mixing chamber. Cooled fluid, such as water, is circulated through the volume 84 by an appropriate fluid circulation system 83. Through conduction, heat transfer occurs from the material in chamber 12 through inner surface 15 to the volume 84 defined by the jacket or wall 84. The cooler 10 of the present invention circulates or mixes a batch of material continuously over the inner surface 15 for the desired heat transfer. Other cooling systems might also be utilized for heat transfer through the wall or walls of chamber 12.

FIG. 2 illustrates one embodiment of the invention for improving the cooling characteristics of cooler 10 to improve the overall cooling process and to reduce the batch cooling time. Specifically, the invention reduces the boundary layers and buildup of material at the cooling surface. Mixing tool 32a comprise a flexible blade 33 which is configured for contacting the chamber inner surface 15. Mixing tool 32a includes an arm 34 which is appropriately coupled to shaft 30 to extend radially therefrom toward inner surface 15. A wiper structure 35 seats the flexible blade 33 so that it contacts surface 15. The flexible blade is operable, when tool 32a is rotated, to sweep across a portion of inner surface 15 and thereby dislodge an amount of material from the surface portion so that another amount of material may contact the surface portion to be cooled. That is, the tool 32a prevents a build up of a compacted boundary layer. The flexible blade 33 allows the tool 32a to contact inner surface 15 for better removal of the material from the surface, while also addressing the issues of expansion and contraction associated with chamber 12, shaft 30, and tool 32a. The flexibility of the blade ensures that the polished inner surface 15 is not damaged, while the sweeping effect ensures a reduced boundary layer around the chamber.

Flexible blade 33 may be formed of any suitable flexible material, such as a suitable elastomer or pliable rubber. However, preferably the blade is formed of a flexible material similar to the material which is being cooled. For example, if a PVC compound is being cooled in the chamber 12, the blade 33 may be made of a clear PVC vinyl material. In that way, should the blade wear, through its contact with surface 15, particles from the blade would not contaminate the cooled material, but generally would be compatible with that material.

As illustrated in FIG. 2, the blade is shown generally oriented perpendicular to the inner surface 15. Alternatively, the blade 33 might be angled, as well. Generally, it is desirable to have a blade 33 which is suitably wear resistant to a degree in coordination with its flexibility. That is, the more flexible the blade, the less wear-resistant it will need to be. A PVC blade of one-eighth to one-quarter inch thickness may be suitable for one embodiment of the invention. Furthermore, different colors might be utilized for the blade material to match the color of the material which is being cooled. In that way, any wear does not affect the color of the overall finished material.

Figure 5A:
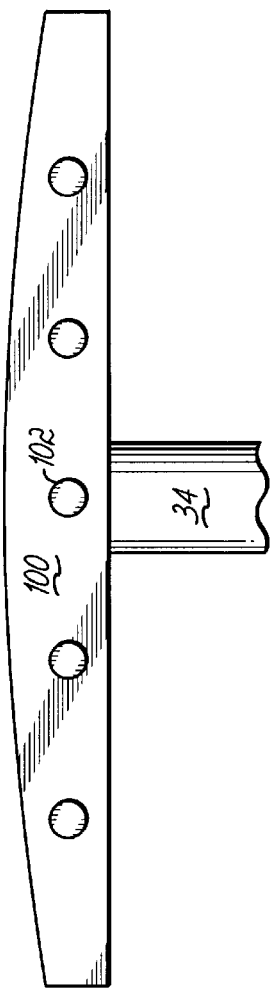
FIGS. 5A, 5B, and 5C are perspective views of components of the blade illustrated in FIG. 4.
Figure 5B:
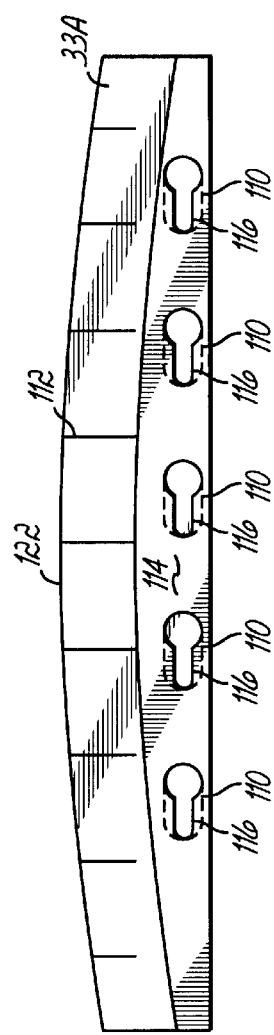
Figure 4:
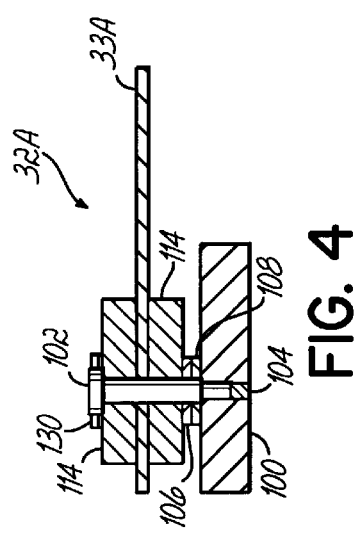
FIG. 4 is a cross-sectional view of a blade in accordance with one embodiment of the invention.

FIGS. 4 and 5A–5C illustrate one embodiment of a tool, 32a in accordance with the principles of the present invention. Referring to FIG. 4, and the tool 32a, including the blade 33a, is made in a stacked or sandwich configuration. Specifically, a plate 100 is coupled to the arm 34 (see FIG. 5A), and includes a plurality of pins 102, which are fastened to the plate 100 by suitable means, such as a weld 104. The pins extend to one side of the plate 100, as illustrated in FIG. 4. FIG. 5A illustrates a perspective view of plate 100 coupled to arm 34, showing the pins 102. Referring again to FIG. 4, the pins 102 support washers 106 and ring springs 108 for mounting the blade or wiper 33a. The blade is sandwiched between two plates 114 as discussed below and is then mounted to plate 100 and arm 34. As illustrated in FIG. 5B, the blade or wiper is formed to have openings 110 corresponding to the pins 102 of plate 100. The pins 102 extend through the openings 110 so that the blade 33a may lay against plate 100, as illustrated in FIG. 4. Blade 33a includes a plurality of slots 112 for greater flexibility of the blade. Specifically, the slots allow the blade to be divided into individual sections which may flex independently of adjacent sections, for improved wiping of surface 15 of the chamber. That is, the blade forms a generally comb shape.

Figure 5C:
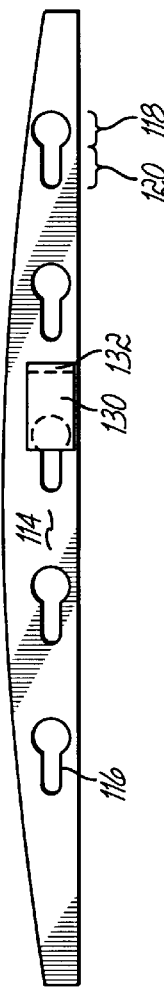

To secure blade 33a to the plate 100, a pair of mounting plates 114 as illustrated in FIG. 5C, are utilized. Mounting plates 114 include openings or slots 116 which have a keyhole shape, for securing and sandwiching the blade 33a between the plates 114 an against plate 100. Specifically, the mounting plates 114 are positioned on either side of the blade 33a to sandwich the blade as shown in FIG. 4. The openings in the plates are aligned with the openings in the blade. The pins 102 then extend through the aligned openings and the larger portions 118 of the slots 116. The plates 114 and the blade are then slid to one side such that the pins overlie the thinner portions 120 of the slots and thereby secure the plates 114 and sandwiched blade to the plate 100. The spring 108 is compressed against plate 100 by the secured plates 114. The resiliency or compressibility of the spring 108 acts to lock the plates 114 and blade in position with the blade 33a being sandwiched between plates 114. To remove the blade 33a, such as to replace a worn blade, plates 114 may be simply slid in the opposite direction and removed from the pins through the larger portions 118 of slots 116. In that way, in the embodiment of the invention illustrated in FIGS. 4 and 5A–5C, the blade may be readily replaced when worn.

To secure the assembly 114, 33a onto plate 100, a clip 130 may be attached to the uppermost plate 114, such as by a weld 132. The clip is made to be resilient and to flex against plate 114. Referring to FIGS. 4 and 5C, the clip is attached to cover a portion of at least one slot 116. When the plates 114 are positioned over the pins 102, a head of one of the pins will extend through portion 118 of the slot 116 and thereby push the clip upwardly to allow the plates 114 to be secured in place on plate 100. When the plates 114 are then slid in one direction with respect to plate 100 and the pins 102 to lock the plates 114 in position, the clip is moved from above the pin 102, allowing the clip to flex and return to its normal position against the plate. The pin head will then overlie the portion 120 of the slots and the clip will bear against the pin and the head of the pin to prevent the plates and blade from being slid in the opposite direction to be removed. This locks the assembly in position. If it is then desirable to remove the assembly, the clip may be pried up to allow the assembly to be slid so that the pin passes beneath the clip and aligns with the larger portion 118 of the slot 116. Although, one clip is shown, multiple clips might also be utilized.

As illustrated in FIG. 5B, blade 33a utilizes a radius or curved edge 122. However, other shapes might also be utilized, such as a straight edge, rather than a curved edge.

In accordance with another aspect of the present invention, motor 38, and the appropriate coupling between the motor and shaft 30 are all configured to be operable for rotating the shaft at a speed in the range of 150–250 to sweep the material from the inner surface. The inventors have found that such speeds, in combination with the inventive mixing tools 32a having flexible blades, provide more rapid and improved cooling of a batch of material. Therefore, the batch cooling time is reduced and the throughput rate of the cooler 10 is improved. Because of the reduced boundary layers and build up of material at the cooling inner surface 15, tools 32a may be rotated more rapidly to direct additional material to the cooling surface. The increased cooling efficiency counteracts additional energy that may be introduced to the process by higher mixing speeds. In such a cooling process, using higher mixing speeds is actually counterintuitive. Specifically, because heat transfer characteristics of the surface 15 were traditionally limited by the boundary layer build up, increased mixing speeds for the tools 32a normally introduces additional heat energy into the system. This additional energy could not be adequately dissipated, thus degrading the cooling process. By reducing the boundary layers at surface 15, the present invention utilizes increased mixing speeds for more rapid cooling, while counteracting heat introduced into the system by the more rapid mixing.

As such, the present invention provides a significant improvement over the prior art. For example, utilizing a system as illustrated in the drawings, the standard speed is in the range of 80–130 rpm. The invention allows an increase in speed by 30–50% over standard industry speeds, and specifically the motor and associated couplings are operable for rotating the shaft at a speed in the range of 150–250 rpm. Utilizing a prior art system, with normal mixing speeds, a batch of material, such as PVC compound, might normally take six minutes to cool to the desired temperature of around 120–125° F. from 225–250° F. Utilizing the invention as illustrated in FIGS. 2 and 2A, and the combination of the inventive flexible blade with increased rotational speeds in the range of 150–250 rpm, the batch cooling time can be reduced to around 3½ minutes. Further reductions are possible utilizing another embodiment of the invention, as illustrated further hereinbelow. As such, the throughput of the cooling process can be increased, resulting in cost savings for the processor.

FIGS. 3, 3A, and 3B illustrate an alternative embodiment of the invention wherein increased speeds are utilized in combination with a mixing tool comprising an air knife. Chamber 12, as illustrated in FIGS. 3, 3A, and 3B, is similar to that illustrated in the previous figures. However, the mixing tool 32b comprises an air knife 37 coupled to the end of arm 34 to rotate around the inner surface 15 of the chamber. Air knife 37 is configured for directing a stream of pressurized air against the inner surface 15 when the tool 32b is rotated, to thereby dislodge an amount of material from a portion of the surface so that another amount of material may contact the surface portion to be cooled. The air knife 37 does not directly contact surface 15. Rather, referring to FIG. 3B the air knife is operable for creating a stream of pressurized air 41 which acts as a blade against surface 15, thereby dislodging material from surface 15, reducing the boundary layer at that surface, and improving heat transfer characteristics. Air knife 37 may be a commercially available product, such as an air knife from Exair Corporation of Cincinnati, Ohio.

In operation, compressed air is directed through an inlet 90, and into a plenum chamber 92. The air is then passed through a thin nozzle 94 to form a primary airstream 96. That primary stream then entrains surrounding air 98 to form the effective blade of pressurized air. In the embodiment illustrated in FIG. 3B, the primary air stream 96 follows a curved profile of the knife. Therefore, when the air knife is mounted as illustrated in FIGS. 3 and 3A, the blade of air is directed against the inner surface 15 generally tangential to the inner surface. Of course, the blade of air might be angled from a purely tangential orientation.

For example, the air knife might be constructed and/or mounted to direct the stream of pressurized air against the inner surface generally perpendicular to the inner surface. In another alternative embodiment, the stream of air might be directed at an angle between the perpendicular and the tangential. Therefore, the air blade might be rotated, as illustrated by reference arrow 100 to vary the direction of the air flow. Referring to FIG. 3, to introduce the pressurized air to the air knife 37, a pressurized air system 102 might be appropriately coupled through the stub end 42 of shaft 30 through a rotary union 43, and ultimately through shaft 30, arm 34 to the air knife 37. Shaft 30 will generally be at least partially hollow for delivering air to knife 37. Depending upon the number of mixing tools and air knives which might be utilized, and the venting capabilities of the chamber, the pressurized air might be delivered in pressures in the range of 5 to 60 psi, in accordance with one embodiment of the invention.

As discussed above, the embodiment of the invention as illustrated in FIGS. 3, 3A, and 3B, provides an improved cooling process and specifically reduces the batch cooling time and improves the throughput rate of the material cooler by reducing boundary layers built up at the internal cooling surface and improving the rate of delivery of new material to the surface for improved heat transfer in the overall batch.

Furthermore, in addition to reducing the insulative boundary layer, the air knife provides a source of cooling air directed against the material to further enhance cooling. The pressurized air from system 102 might be cooled as well in accordance with another aspect of the invention, to further enhance cooling. The embodiment illustrated in FIGS. 3, 3A, and 3B, including a combination of a reduced boundary layer, cooling air from the knife 37 and increased tool mixing speeds in the range 150–250 rpm has decreased the normal six minute batch cycle to approximately two minutes, which significantly improves the throughput of the machine, and therefore improves the cost effectiveness of such a cooler. Venting of air introduced into the cooling system by knife 37 may be appropriately vented at vent 20.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. An apparatus for cooling a PVC material, the apparatus comprising:
   a chamber having an inner surface, the chamber defining an inner space configured for receiving material to be cooled;
   a rotatable shaft extending through the chamber inner space, the shaft operable for being rotated by a motor;
   at least one mixing tool coupled to the shaft to rotate with the shaft, the mixing tool adapted to mix the material while rotating around the inner surface of the chamber so the material contacts the inner surface to be cooled thereby;
   the mixing tool comprising a flexible blade configured for contacting the chamber inner surface, the flexible blade being operable, when the tool is rotated, for flexing backwardly and sweeping across a portion of the inner surface to dislodge an amount of material from the surface portion so that another amount of material may contact the surface portion to be cooled;
   the flexible blade being made of a material which is present in the material being cooled;
   the motor operable for rotating the shaft at a speed in the range of 150 to 250 rpm to sweep the material from the inner surface;
   to thereby provide improved cooling of the PVC material.

2. The apparatus of claim 1 wherein a portion of said inner surface is cooled to facilitate cooling of the material.

3. The apparatus of claim 1 further comprising a fluid circulation system for circulating cooled fluid around a portion of the chamber for cooling part of the chamber inner surface.

4. The apparatus of claim 1 wherein said flexible blade is made of an elastomer.

5. The apparatus of claim 1 wherein said mixing tool comprises a first mounting plate and at least a second mounting plate releasably coupled with the first mounting plate, the first and second mounting plates configured to secure the flexible blade.

6. The apparatus of claim 5 further comprising a pair of second mounting plates holding the flexible blade therebetween, the pair of second mounting plates and blade being releasably coupled with the first mounting plate.

7. The apparatus of claim 5 further comprising a plurality of pins on one of the first and second mounting plates and a plurality of corresponding apertures in the other of the first and second mounting plates, the pins engaging the apertures to secure the plates together with the flexible blade therebetween.

8. The apparatus of claim 7 further comprising at least one clip coupled to the mounting plate containing the apertures, the clip engaging at least one of said pins for securing the plates together.

9. The apparatus of claim 1 wherein said flexible blade is releasably secured with the mixing tool.

10. The apparatus of claim 1 wherein said flexible blade includes at least one slot formed therein.

11. The apparatus of claim 1 wherein said flexible blade includes an arcuate edge for sweeping across a portion of the inner chamber surface.

12. The apparatus of claim 1 wherein said flexible blade is formed of a material having one of a number of selectable colors for matching the color of the material being cooled.

13. A method for cooling a PVC material, the method comprising:
   delivering a batch of the material to be cooled into an inner space of a chamber, the material batch contacting an inner surface of the chamber;
   rotating at least one mixing tool coupled to a shaft in the chamber inner space to mix the material so the material contacts the inner surface to be cooled thereby;
   positioning a flexible blade on the end of the mixing tool with an edge positioned for contacting the chamber inner surface and, when the tool is rotated, sweeping across a portion of the inner surface to dislodge an amount of material from the surface portion so that another amount of material may contact the surface portion to be cooled;
   rotating the mixing tool and flexible blade at a speed in the range of 150 to 250 rpm to sweep the material from the inner surface;

to thereby provide improved cooling of the PVC material.

14. The method of claim 13 further comprising cooling a portion of said inner surface to facilitate cooling of the material.

15. The method of claim 13 further comprising circulating cooled fluid around a portion of the chamber for cooling part of the chamber inner surface.

16. The method of claim 13 wherein said flexible blade is made of an elastomer.

17. The method of claim 13 wherein said flexible blade is made of PVC.

18. The method of claim 13 wherein said flexible blade is made of a material which is present in the batch of material being cooled.

19. The method of claim 13 further comprising releasably coupling the flexible blade to the mixing tool.

20. The method of claim 13 wherein the flexible blade includes at least one slot formed therein.

21. The method of claim 13 further comprising using a flexible blade having a color similar to a color of the batch of material to be cooled.

* * * * *